April 12, 1955
R. L. DOWLING, JR., ET AL
2,706,081
BUILDING COST SLIDE RULE
Filed July 2, 1952
2 Sheets-Sheet 1
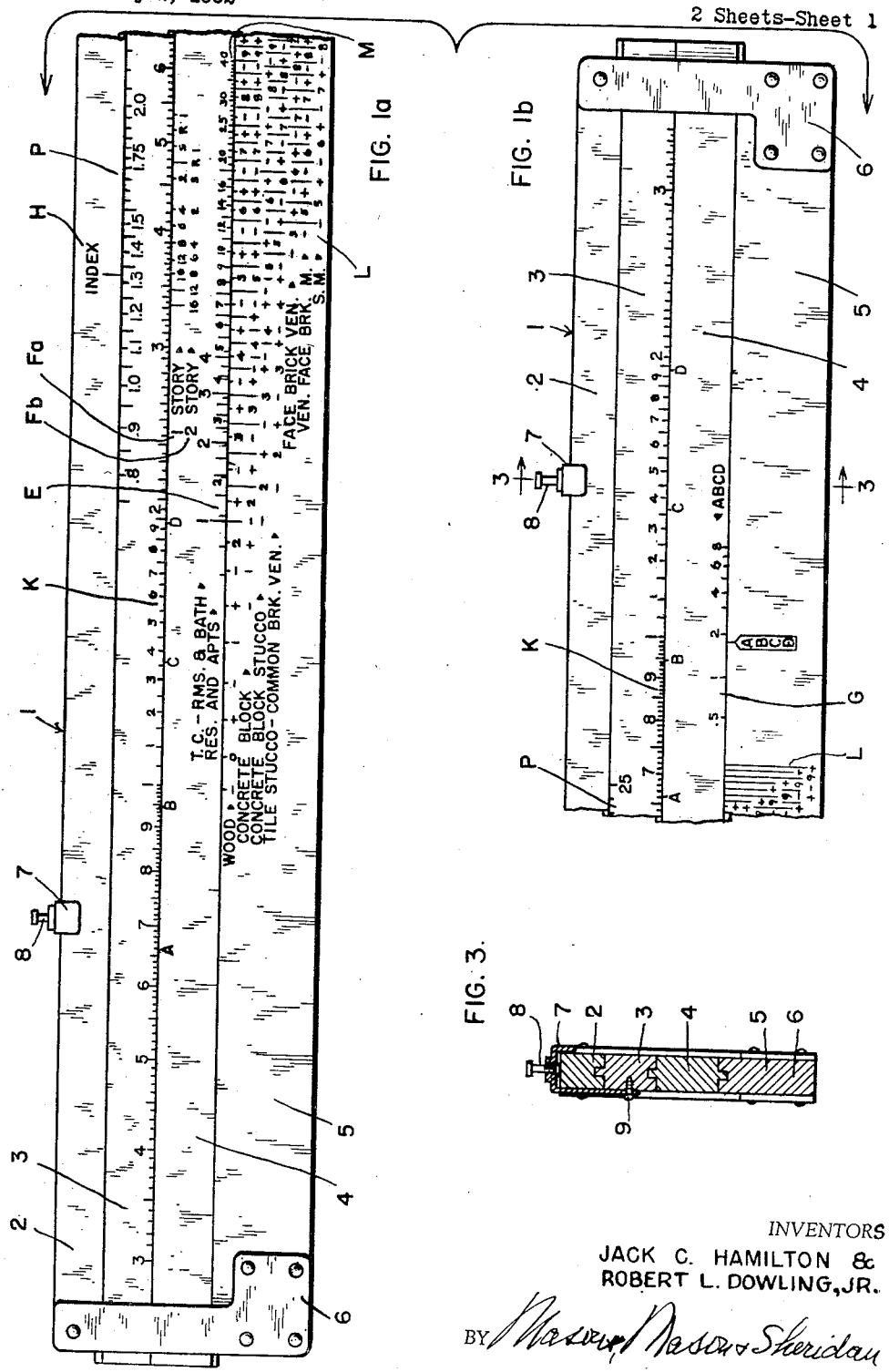
INVENTORS
JACK C. HAMILTON &
ROBERT L. DOWLING, JR.
BY *Mason, Mason & Sheridan*
ATTORNEYS

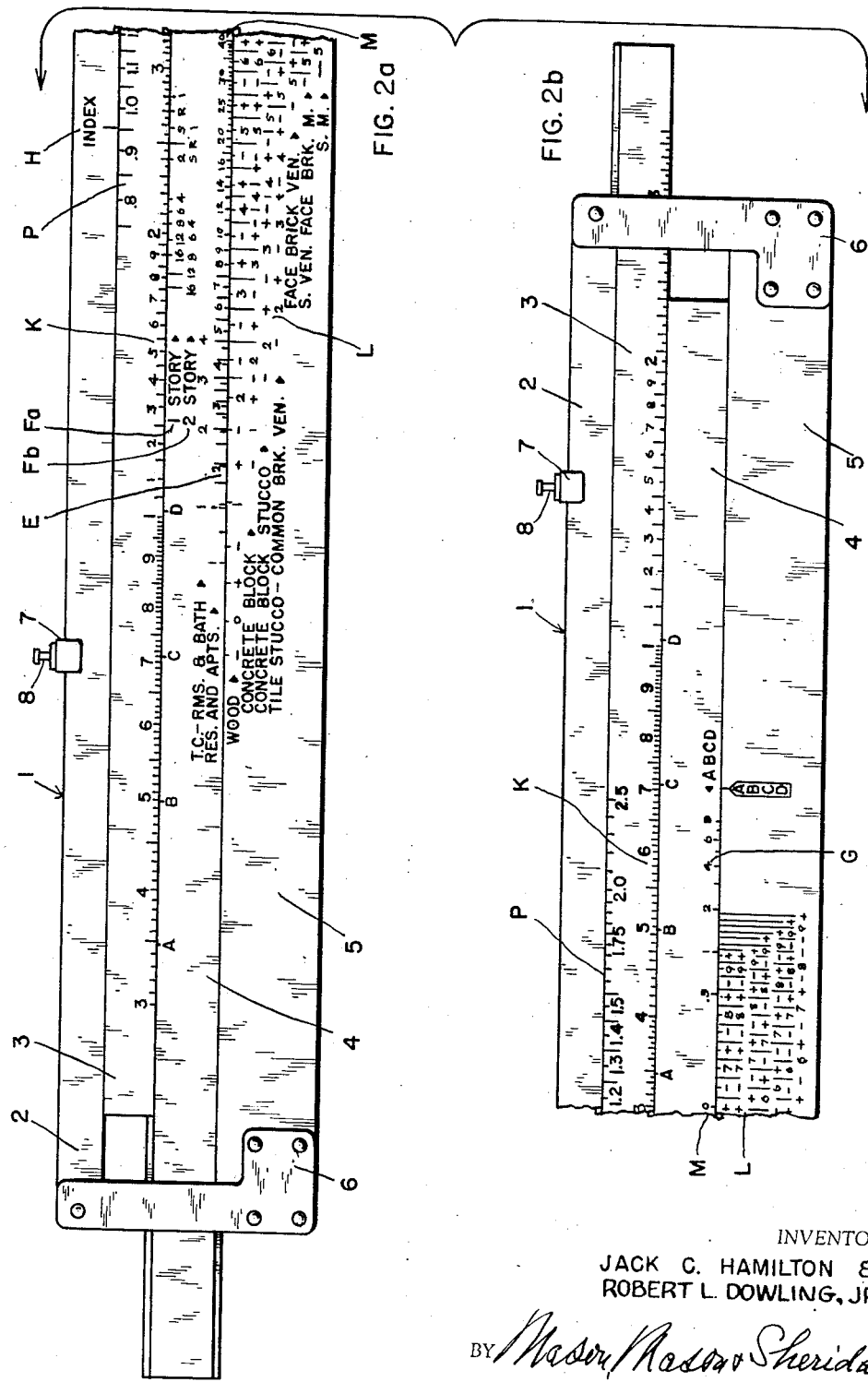

United States Patent Office 2,706,081
Patented Apr. 12, 1955

2,706,081

BUILDING COST SLIDE RULE

Robert L. Dowling, Jr., Bradenton, and Jack C. Hamilton, Clearwater, Fla., assignors to Warren P. Hunnicutt, St. Petersburg, Fla.

Application July 2, 1952, Serial No. 296,893

6 Claims. (Cl. 235—70)

The present invention relates to a mechanical computing apparatus and more particularly to a slide rule used for solving problems involved in building construction cost estimating.

A principal object of this invention is to provide a slide rule with which problems in building construction and cost estimating may be simplified and quickly solved.

Another object of this invention is to provide a simplified device which is particularly suitable for use in determining the cost rates per square foot for various types of buildings constructed from various types of materials in combination with a variable indexing means which takes the time and location factors into consideration.

A further object of this invention is to provide a mathematical and mechanical computer in the form of a slide rule, the operation of which may be readily understood and used by one unskilled in mathematics, in estimating building construction costs of various types of buildings.

Other and further objects will appear from the following description.

The apparatus disclosed herewith is a slide rule of the type having two elongated fixed members and two elongated sliding members all with either scales or indicia on their surfaces. The scales represent various factors and formulas, used in the cost estimation system, which are integrated in the design of the slide rule. The proper cost rate per square foot is determined for any type building constructed of various types of materials, by moving the sliding members to the proper scale settings and reading the cost rate per square foot at the proper reading position. Different types of buildings, such as irregular shaped, multistoried, or of a different type, such as tourist courts with baths, etc. have all been considered in the scales or indicia of this slide rule.

All cost estimation figures and formulas used in the scales are based on the Boeckh building cost index of 100. Provision has been made for index multiples to be used to correct the cost figures to the index of any location at any time.

The entire system is based on a cost per square foot basis. A single square foot area is used for each building and contains the correct square foot cost from which the cost of the total area is to be computed for the entire building. A single cost rate is used for each type of building. Differentials in cost rates between one part of a building and another are handled by factoring the various areas in keeping with the cost of the body of the building. Cost rates are provided for buildings of all ordinary kinds of construction.

Cost increase and decrease curves per square foot, depending on the total area, are provided for in the scales. For instance, the cost per square foot would decrease progressively as the building area increased and accordingly such a curve is reflected in the scales.

Similarly, the scales reflect the curves in the cost per square foot in the case of houses, apartment houses, tourist courts, etc., having kitchens, baths, etc., and a special scale represents the cost per square foot curve of tourist courts having only rooms with baths. Cost variations are provided for houses of various shapes and for apartment houses and tourist courts varying in the number of units from two to sixteen. Separate building cost rates are provided for residential garages, i. e., garages of residences, and other buildings of similar construction.

Buildings are classified according to specifications for ten grades of construction materials. Cost deviations within a class are handled by a system of plus and minus signs.

In short, a system of building classes according to the type, kind and quality of construction materials is provided.

Although the slide rule herein described is especially adapted and designed for use with the particular building cost estimation system with which it is associated, the principles used for the design and construction of the rule are not peculiar only to a rule used with this particular cost estimating system.

It is obvious that any size slide rule of this type may be employed with identical results. In addition, a slide rule of this type may be made from any suitable material such as wood, plastics, metal, fiber board, cardboard, or any combination of two or more of the aforementioned materials.

Referring to the drawings:

Figs. 1a and 1b are elevational views of one form of the slide rule embodying our invention.

Figs. 2a and 2b are elevational views of the same slide rule with its two slidable members in a position for calculating a particular building cost estimation problem.

Fig. 3 is a cross-sectional view taken in the plane represented by the line 3—3 of Fig. 1b.

In the drawings the slide rule 1 consists of two elongated and stationary bars or members 2 and 5 having scales thereon and held rigidly together by means of plates 6. Upper and lower elongated slides 3 and 4 also having scales thereon are slidably adjustable with relation to each other and with relation to the stationary members or slides.

Fig. 3 shows clamps 7 affixed to slidable member 3 by means of screws 9 whereby slide 3 may be secured in an adjusted position when screws 8 of the pair of clamps are locked.

On the upper elongated stationary bar or member 2 is a single line H for index. The adjacent elongated slide 3 has a scale, hereafter referred to as a scale P, on its upper edge. This scale is graduated from an index of 75 to an index of 250. Scale P is used in adjusting building cost estimations for a particular time and at a particular location. Adjustment of the index is made by unlocking screws 8 and moving slide 3 until the proper index on scale P is opposite the index mark, then locking slide 3 by means of screws 8. All cost rates on the rule then will be at this index.

Along the lower edge of slide 3 is a regular slide rule logarithm scale, hereafter referred to as scale K, which for convenience in the present construction has been extended on each end. Scale K is used to read all cost per square foot building rates.

On the lower elongated stationary member 5 is a scale, hereafter referred to as scale L, having a plurality of linearly arranged independent numerical designations, each differing from the other in its relation to the graduated scale, one line of such designations being for each kind of construction with the class positions for various kinds of construction materials in the proper position along the line. The scale is graduated from wood class 0 minus, to stone on masonry class 9 plus.

Directly opposite and along the lower edge of elongated slide 4 is the residence and apartment house area scale, hereafter referred to as scale M. Scale M is graduated from 100 to 4,000 sq. ft. Above and along the left end of this scale is a special scale, which hereafter will be referred to as E scale, and is for tourist court buildings. Scale E is graduated from 100 to 400 sq. feet.

On the upper edge of slide 4 and in the center is a floor scale, hereafter referred to as scale F. It can be seen that scale F consists of figures and letters and is divided into two sections Fa and Fb. The upper section Fa of scale F is used for all one and one and one half story houses and the lower section Fb is used for all two, two and one-half and three story houses. On both sections the letters S, R, and I may be seen. These letters refer to square, rectangular, and irregular shaped houses such as L-shaped, etc.

Scales Fa and Fb may also be used for apartment houses in which case the same principles apply as in the case of houses. However there is further provision made for variances in building cost estimations in the event that various numbers of apartments are to be included in the particular building. In such a case a decreasing building construction cost estimation curve is reflected in scale F as can be seen by Nos. 16, 12, 8, 6, 4 and 2 which Nos. are seen in both scales Fa and Fb.

Along the upper edge of elongated stationary member 5 and to the right of scale L is a position marked ABCD in vertical lettering which is a marker for the scale on the lower edge of slide 4 and to the right of scale E. The above scale is referred to as scale G and is used for residential garages and small out buildings. This scale is graduated from 50 to 800 sq. ft.

Along the upper edge of slide 4 and to the right and left of scales Fa and Fb are position Nos. marked A, B, C, and D in a horizontal arrangement. These are the A, B, C and D class reading positions for garages and other small out buildings.

The general use of the slide rule is as follows: Assume that a building construction cost estimate is needed for a house. First, screws 8 are unlocked and slide 3 is adjusted until the index mark H on member 2 is opposite the proper number on slide 3. Thus both time and location factors are considered and allowed for. Screws 8 are then locked, securing slide 3 in its proper position. Next the construction material class is found on scale L which is printed on member 5. Slide 4 is then adjusted until the square foot area of the house, represented in scale M, is directly opposite the proper class mark in scale L. Either scales Fa or Fb, on slide 4, is then consulted and the proper mark may be readily found and opposite this mark on either scale Fa or Fb, the proper mark on scale K on slide 3 is noted. This is the cost per square foot for the particular house under present consideration.

The above description of the use of the slide rule has been furnished to show the method of operation. The following are specific examples for each type of building for which the slide rule is intended. Before each estimation, the proper index number involving both time and location factors must be set and the slide 3 locked. It is assumed that this is done in each example before estimations are computed.

The arrangement of the scales and their respective moduli is such that when the settings are made as indicated above, and in the example that follows, the cost per square foot of area for the desired structure is given.

How to use the rule for houses:

Before using the rule for houses, four factors must be determined. These are: (1) the type of construction, (2) the class of construction materials, (3) the total square foot area, and (4) the shape of the building.

In using the slide rule, locate the proper type of construction materials on scale L and the corresponding correct number or plus or minus sign on scale L seen on member 5. Adjust slide 4 so that the correct mark on scale M, which represents the residence and apartment house area, is exactly opposite that correct mark on scale L.

Next, locate the proper number and letter mark on scale Fa or Fb which represents various numbers of apartment house stories and also various shaped buildings and read on scale K, directly above and on slide 3, the cost per square foot for that particular house. To finish calculating the construction cost, multiply the total square foot area of the house by the cost per square foot rate.

How to use the rule for duplex houses and apartment houses:

Before using the rule for duplexes and apartment houses, four factors must be determined. These are: (1) the type of construction, (2) the class of construction materials, (3) the number of apartments, (4) the total square foot area of all apartments, assuming that they are all similar.

In using the rule, proceed as in the case of the cost estimation of houses in adjusting member 4 to its proper relationship with member 5. In using scale F, select the correct section, be it for one, two or three stories and the proper number of apartments be it 16, 12, 8, 6, 4 or 2 apartments. Once the correct mark on scale F is located, a reading may be taken directly opposite it on scale K seen on slide 3. Construction cost per square foot is then calculated and by multiplying cost per square foot by the number of square feet in one apartment, a cost estimate is determined.

It is then an elementary matter to multiply the cost of one apartment by the number of apartments contemplated. In the event that the apartments are dissimilar, a construction cost estimation may be determined by simply treating each apartment separately and adding their values bearing in mind that the mark on scale F should still coincide with the total number of apartments and stories contemplated.

How to use the rule for tourist courts:

As in the case for cost-estimating duplex and apartment houses, four factors must be determined. These are: (1) the type of construction, (2) the class of construction materials to be used, (3) the number of units, (4) the total square foot area of all apartments, assuming that they are all similar.

In using the rule, proceed exactly as in the case of duplexes and apartment houses except that scale E is employed in place of scale M. Otherwise the two procedures are identical.

How to use the slide rule for garages and other small out buildings:

Before using the rule for garages and other small out buildings, two factors must be determined. These are: (1) the class of construction materials and (2) the total square foot area.

In using the rule, locate the A, B, C, D (vertical) position mark on member 5. Slide 4 until the total square foot area of the building on scale G is exactly opposite the A, B, C, D mark (vertical). Then refer to the A, B, C and D class reading positions on the upper edge of slide 4 and to the right and left of scales Fa and Fb. Locate the proper reading position according to the class of the building and read above and directly opposite that mark on scale K located on slide 3 to determine the cost per square foot rate of the particular garage or small out building. To calculate the construction cost simply multiply the total square foot area of the building by the cost per square foot rate.

The foregoing examples are given to illustrate the solution of typical building construction cost estimation problems, but other related problems with different given and required elements can also be solved.

Various modifications will occur to those skilled in this art, but no limitation is intended by the phraseology of the foregoing, or illustrations of the accompanying drawings except as indicated by the appended claims.

We claim:

1. A building cost slide rule comprising two spaced parallel fixed bars including an upper bar and a lower bar, an upper slide and a lower slide cooperating therewith, both slides being located in the space between said fixed bars, said slides being independently movable, all of said bars and slides having parallel upper and lower edges, index means located adjacent the lower edge of the upper stationary bar, a scale adjacent the upper edge on said upper slide indicating time and location factors, a construction material scale located on said lower fixed bar, said lower slide having a scale adjacent the lower edge thereof indicating area whereby indicia on said last named scale may be adjusted to be opposite indicia on the class scale, a standard logarithm scale on the lower edge of said upper slide, and said lower slide having additional scale means on the upper edge thereof adapted to cooperate with said logarithm scale for indicating cost per square foot, and means for locking said upper slide to said upper fixed bar in an adjusted position.

2. A building cost slide rule comprising two spaced parallel fixed bars including an upper bar and a lower bar, an upper slide and a lower slide cooperating therewith, both slides being located in the space between said fixed bars, said slides being independently movable, all of said bars and slides having parallel upper and lower edges, index means located adjacent the lower edge of the upper stationary bar, a scale adjacent the upper edge on said upper slide indicating time and location factors, a construction material scale located on said lower fixed bar, said lower slide having a scale adjacent the lower edge thereof indicating area whereby indicia on said last named scale may be adjusted to be opposite indicia on the class scale, a standard logarithm scale on the lower edge of said upper slide, and said lower slide having additional scale means adapted to cooperate with said logarithm scale for indicating cost per square foot, and means for locking said upper slide to said upper fixed bar in an adjusted position.

3. A building cost slide rule comprising two spaced parallel fixed bars including an upper bar and a lower bar, an upper slide and a lower slide cooperating therewith, both slides being located in the space between said fixed bars, said slides being independently movable, all of said bars and slides having parallel upper and lower edges, index means located adjacent the lower edge of the upper stationary bar, a scale adjacent the upper edge on said upper slide indicating time and location factors, a construction material scale located on said lower fixed bar, said lower slide having a scale adjacent the lower edge thereof indicating area whereby indicia on said last named scale may be adjusted to be opposite indicia on the class scale, a standard logarithm scale on the lower edge of said upper slide, and said lower slide having additional scale means on the upper edge thereof adapted to cooperate with said logarithm scale for indicating cost per square foot, and means for locking said upper slide to said upper fixed bar in an adjusted position.

4. A slide rule for computing building construction costs comprising a frame having spaced substantially parallel upper and lower fixed bars, a pair of cooperating independent upper and lower slide members between said fixed bars, said upper bar having an index mark thereon, said upper slide member having on its upper edge a logarithmic numerical scale having indicia representing time and location factors, and on its lower edge an elongated logarithmic numerical scale having indicia representing cost per square foot, means for locking said upper slide in adjusted position on said upper fixed bar, said lower slide having on its upper edge a graduated scale having indicia comprising a series of markings representing building shape and story factors, and on its lower edge a graduated scale having indicia representing areas in square feet, said lower fixed bar having thereon a scale graduated to represent building construction types and having therebelow a group of independent linearly arranged numerical indicia, each line representing a different type of construction, and each member of said group being differently related to the graduated scale.

5. A scale rule as set forth in claim 4, in which the setting of the upper scale of the upper slide determines the cost per square foot for a given place and time.

6. A slide rule as set forth in claim 5, wherein for any given setting of the upper slide any of the possible costs for that setting may be obtained by a single setting of the lower slide.

References Cited in the file of this patent

UNITED STATES PATENTS

| | | |
|---|---|---|
| 1,431,409 | Miller | Oct. 10, 1922 |
| 2,375,878 | Willens | May 15, 1945 |
| 2,455,522 | Ringler | Dec. 7, 1948 |

FOREIGN PATENTS

| | | |
|---|---|---|
| 537,186 | France | Feb. 25, 1922 |

OTHER REFERENCES

"Special Slide Rules," pages 13 and 19–32, by J. N. Arnold, published by Purdue University at La Fayette, Indiana, as Bulletin No. 32 of the Engineering Extension Department, in September 1933.